United States Patent [19]
Dischler

[11] 3,786,743
[45] Jan. 22, 1974

[54] SPINDLE PRESS

[75] Inventor: Helmut Dischler, Neusa-Udesheim, Germany

[73] Assignee: Noropress GmbH Iressen und Presswerkzeuge & Co. KG, Dusseldorf, Germany

[22] Filed: Sept. 26, 1972

[21] Appl. No.: 292,327

[30] Foreign Application Priority Data
Oct. 12, 1971  Germany.................. P 21 50 726.6

[52] U.S. Cl..................... 100/270, 72/454, 100/289
[51] Int. Cl.............................................. B30b 1/08
[58] Field of Search........ 100/289, 270, 271, 269 R; 72/454

[56] References Cited
UNITED STATES PATENTS
3,589,278  6/1971  Brauer et al...................... 100/271

FOREIGN PATENTS OR APPLICATIONS
210,445    9/1957   Australia......................... 100/269 R
731,187    6/1955   Great Britain..................... 100/270
1,086,379  10/1967  Great Britain..................... 100/289
1,009,400  11/1965  Great Britain..................... 100/289
1,133,530  11/1968  Great Britain..................... 100/289

Primary Examiner—Billy J. Wilhite
Attorney, Agent, or Firm—Berman, Davidson & Berman

[57] ABSTRACT

The present invention is concerned with improvements to that type of spindle press which has a spindle mounted in the press frame in an axial thrust bearing, a fly-wheel continuously rotating in one direction and an hydraulically actuated coupling arranged between the fly-wheel and the spindle which coupling during the operational stroke produces a connection between the fly-wheel and the spindle.

To reduce or eliminate the risk of overloading in the late operation of the coupling at the end of the press stroke and thereby damage to the press or excessive wear on the coupling parts the spindle press in accordance with the invention is provided with a hydrostatic support device to absorb the axial forces this support device having a pressure chamber in pressure-fluid communication with a pressure chamber of an hydraulically actuating device for the coupling, the pressure chambers being connected to a common outflow valve which opens when a predetermined pressure is reached in the pressure-fluid system.

12 Claims, 4 Drawing Figures

SPINDLE PRESS

BACKGROUND OF THE INVENTION

The invention is concerned with that type of spindle press having a spindle mounted in the press frame in an axial thrust bearing, a fly-wheel continuously rotating in one direction and an hydraulically actuated coupling arranged between the fly-wheel and the spindle which coupling during the operational stroke produces a connection between the fly-wheel and the spindle.

The advantage of this type of spindle press in relation to conventional spindle presses in which the spindle is fixedly connected with a fly-wheel mass is that the mass of the rotating part to be accelerated in each press stroke from rest and the mass to be retarded in each press impact again up to rest can be kept very small. The procedural advantage accordingly lies in that any desired quantity of energy can be removed from the fly-wheel and with a practically constant ram speed and force and a disconnection dependent on force or path. The continuously rotating fly-wheel serving as energy store can be driven continuously from an electric motor wherein the energy removed in each press impact from the fly-wheel is small in relation to the total energy stored in the fly-wheel.

A particular problem in the spindle presses of the known type is the risk of overloading in the late operation of the coupling at the end of the press stroke. In the worst case it can lead to damage to the press. At least however there occurs overslipping of the coupling and accordingly a very strong heating of the coupling parts and an excessive wear of these parts. Considerable heating and thereby induced wear of the coupling parts appears also with a prompt operation of the coupling since the coupling parts must always be separated from one another by the presence of a large press force, that is to say to a point in time at which the coupling excerises a large turning moment. During the release process there is positively obtained an overslipping of the coupling and thereby induced wear.

It is an object of the present invention to construct a spindle press of the initially mentioned type in such a way that an overloading of the press or respectively an excessive wear on the coupling can be excluded.

SUMMARY OF THE INVENTION

According to the invention there is provided a spindle press with a spindle mounted in an axial thrust bearing in the press frame, a fly-wheel continuously rotating in one direction and an hydraulically actuated coupling arranged between the fly-wheel and the spindle which produces during the working stroke a connection between the fly-wheel and the spindle, wherein this spindle press is characterised in that in the press is provided a hydrostatic support device for absorption of the axial forces the pressure chamber of which connects with the pressure chamber of the hydraulic actuating device for the coupling by pressure-medium conduits, wherein the pressure-medium system formed from the pressure-medium chamber of the hydrostatic support device and the hydraulic actuating device for the coupling is connected to a common outflow valve, which opens on the attainment of a predetermined pressure-medium pressure in the pressure-medium system.

This construction of the spindle press enables the load removal of the hydraulic supporting device absorbing the axial forces and the opening of the coupling to take place positively at the same point in time. An overloading of the press is also safely excluded. Inasmuch as the pressure chamber of the hydrostatic supporting device is relieved during the releasing step of the coupling and a certain displacement of the axially movable parts of this supporting device is possible, during the release process the pressure force and therefore the turning moment transmitted by the coupling are very slight so that the wear on the coupling is substantially reduced.

According to a particularly preferred embodiment of the invention the hydrostatic support device is constructed as an hydrostatic axial thrust bearing for the spindle.

If the axial forces arising are so large that because of the packing difficulties arising a hydrostatic axial thrust bearing cannot be used, the hydrostatic supporting device can be arranged elsewhere in the press. Thus it is possible for example to construct the hydrostatic support device as a piston-and-cylinder unit and to arrange the spindle in the upper part of the press above the axial thrust bearing, which in this case can be constructed as ball bearings or roller bearings. It is likewise possible to arrange the hydrostatic supporting device in the press piston or in the press table.

In order to prevent a premature closure of the outflow valve, this is constructed as self-locking in the open position.

On attainment of the permissible highest pressure in the pressure-medium system the outflow valve must be opened as rapidly as possible. In order to attain this the outflow valve has a spring-loaded piston-shaped valve body which is displaceable in a cylindrically shaped casing and has on the side remote from the spring a conical control surface, which serves for the closing off of an outflow nozzle, which has a smaller diameter than the piston-shaped valve body, wherein the cylindrically shaped casing is provided with an outflow opening which lies in the stroke path of the piston shaped valve body. With such constructed outflow valves the pressure-medium pressure in the pressure-medium system loads the spring-loaded piston-shaped valve body first of all only with the force which acts on the cross-section surface of the outflow nozzle. After lifting of the conical control surface of the outflow nozzle the pressure-medium pressure however acts on the full section of the piston-shaped valve body so that this is promptly pushed back in the cylindrical-shaped casing and the outflow opening arranged in its stroke path is set free.

To ensure that the outflow valve is opened at the end of the stroke path of the press piston, when sufficient pressure is not built up in the pressure-medium system of the hydrostatic support device and the hydraulic actuating device for the coupling to open the outflow valve, it is further provided that the outflow valve is additionally actuatable with the assistance of a stroke limiting switch actuated by the press piston. This stroke limiting switch is suitably constructed as a hydraulic pilot valve which on actuation sets free a pressure-medium flow into the cylinder space of the outflow valve above its piston-shaped valve body.

According to a particularly preferred embodiment of the invention it is provided that the hydraulic actuating device for the coupling has an actuating piston, the surface of which impacted by the pressure-medium is associated with a pressure chamber, which on the opposite lying side is limited by an abutment, acting as a piston of the part of the hydrostatic axial thrust bearing fixedly connected with the spindle. In this way any possible pressure medium loss occurring from the pressure chamber of the actuating device for the coupling can be automatically compensated for, in which this pressure chamber through displacement of the abutment acting as piston is reduced corresponding to the pressure-medium loss.

The axially movable part of the hydrostatic supporting device suitably has a bearing surface which is substantially larger than the surface of the actuating piston of the coupling. As a consequence of this surface ratio the force pressing the two coupling halves on one another is always substantially smaller than the pressure force of the pressure piston supported in the hydrostatic supporting device. The force pressing the two coupling halves on one another is however always proportional to the force applied from the pressure piston in consequence of the connection of the pressure-medium chambers of the hydrostatic supporting device on the one hand and the hydraulically actuating device of the coupling on the other hand.

A particularly economical construction and accordingly compact form of the press is given if both the actuating piston for the coupling and the axially movable part of the hydraulic axial thrust bearing are constructed in circular form and together with the associated cylinders fixedly connected with the press frame are arranged coaxially on the spindle.

BRIEF DSCRIPTION OF THE DRAWING

FIG. 1 shows a spindle press in accordance with the invention in longitudinal section, FIG. 2 shows an enlarged section of the spindle bearing and the actuating device of the coupling from FIG. 1, FIG. 3 shows an outflow valve in section and the associated hydraulic control schematically illustrated and FIG. 4 shows the spindle press under-part with a support device arranged in the press table.

DESCRIPTION OF THE PREFERRED EMBODIMENTS

Figure 1:
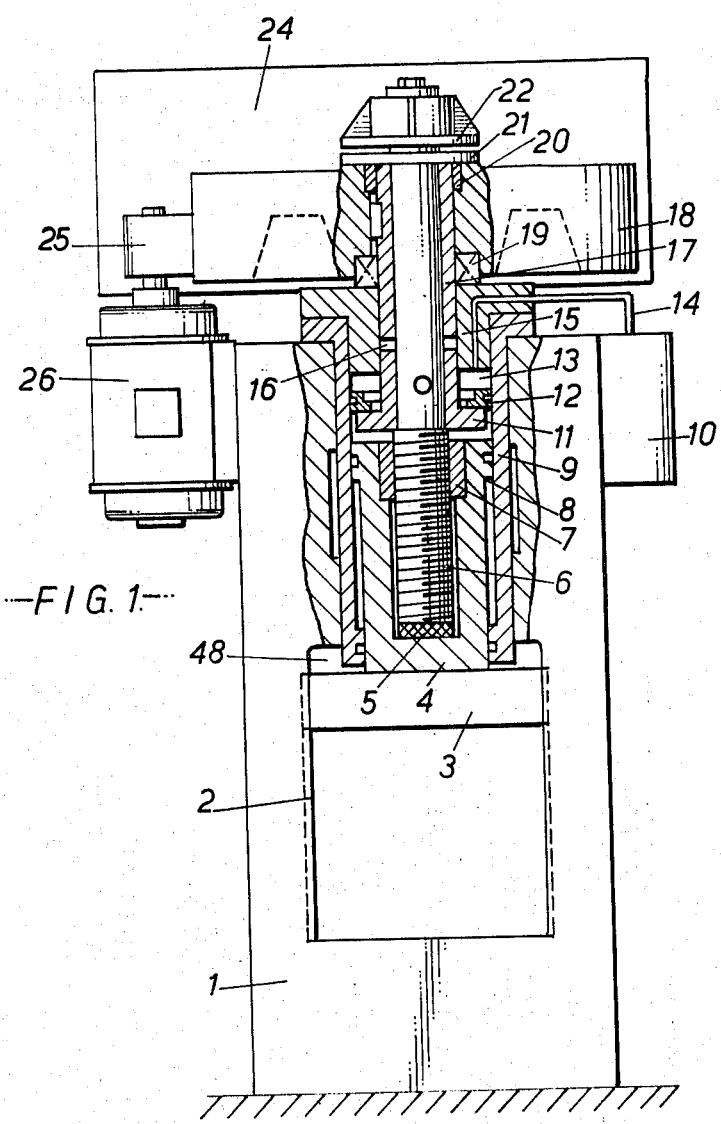

In the drawings reference numeral 1 is the press frame. In the press frame 1 a press piston carriage 3 is guided in guide means 2, which carriage is non-rotatably connected with a piston 4 movable in a cylinder 9. The cylinder 9 is flanged on in the upper cross beam 10 of the press frame 1. The annular chamber 8 of the cylinder 9 is connected through a connector 48 at its lower end with a compressed air container, not illustrated, which serves as spring storage. A nut 7 is fixedly arranged in the piston 4 on which nut the thread of a spindle 6 is rotatably received. A dash-pot means 5 is arranged between the surface of the spindle 6 and its associated movement chamber in the piston 4.

Figure 2:
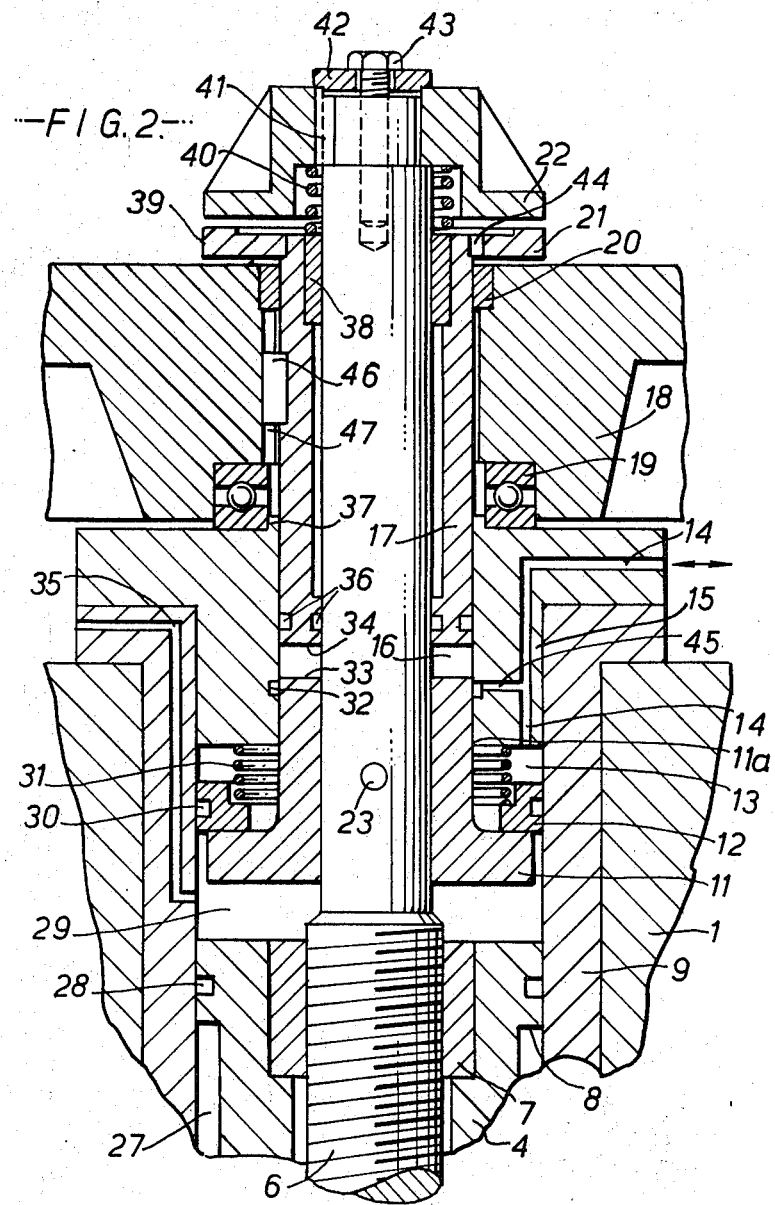

Above the highest position of the piston 4 there is arranged in the cylinder 9 a stroke chamber 29 (FIG. 2) for the axially movable part of a hydrostatic axial thrust bearing, the pressure chamber of which is indicated by reference number 13. The movable part of the hydrostatic axial thrust bearing has a bearing shoulder 11, which is fastened by means of a securing bolt 23 on the spindle 6 and the tolerance of which in relation to the inner wall of the cylinder 9 is packed by a ring 12 under the action of a spring 31 by means of a packing 30. The cylinder 9 has in its wall a conduit 35 which connects the chamber 29 with the atmosphere, in order to make possible if necessary the outflow of leaking oil. The cylinder 9 is closed at its upper end by means of a cover flange 15 which forms the fixed part of the hydrostatic axial thrust bearing and has in the centre a through bore. In this is axially displaceably arranged on the one hand an annular piston shaped abutment 11a of the bearing shoulder 11 and on the other hand a likewise annular actuating piston 17 serving for actuation of the coupling. This actuating piston 17 carries a coupling half 21 with a friction coating 39 and further has a sliding bush 38, with which it is mounted axially displaceable on the spindle 6. The actuating piston 17 is connected by a sliding key 46 and groove 37 fixed against rotation with the fly-wheel 18, which is co-axially arranged with the spindle 6 or the actuating piston 17 respectively. The fly-wheel 18 is mounted centrally on the cover flange 15 by an axial thrust bearing 19 at 37. The fly-wheel 18 is together with actuating piston 17 continuously driven by an electric motor 26 through a drive 25.

The part of the actuating piston 17 engaging in the bore of the cover flange 15 is packed by means of a slide packing 36 both in relation to the cover flange 15 and the spindle 6. The cover flange 15 is furthermore penetrated by a pressure-medium conduit 14 which connects the pressure chamber 13 of the hydrostatic axial thrust bearing with the inlet or outlet respectively of the pressure-medium. From this pressure-medium conduit 14 there branches off into the cover flange 15 a pressure-medium conduit 45 which opens out into an annular groove 32 in the bore of the cover flange 15 and makes possible a common actuating of the hydrostatic thrust bearing and the actuating piston 17. At the upper end of the spindle 6 there is applied in rotation-fixed manner the other friction coupling half 22 by means of a cover 42, screw 43 and adjusting spring 41. Both coupling halves 21 and 22 are pressed against one another in the rest position by means of a spring 40.

The upper part of the spindle press is, in the region of the coupling 21, 22 of the fly-wheel 18 and the drive 25, covered over by means of a covering hood 24.

Figure 3:
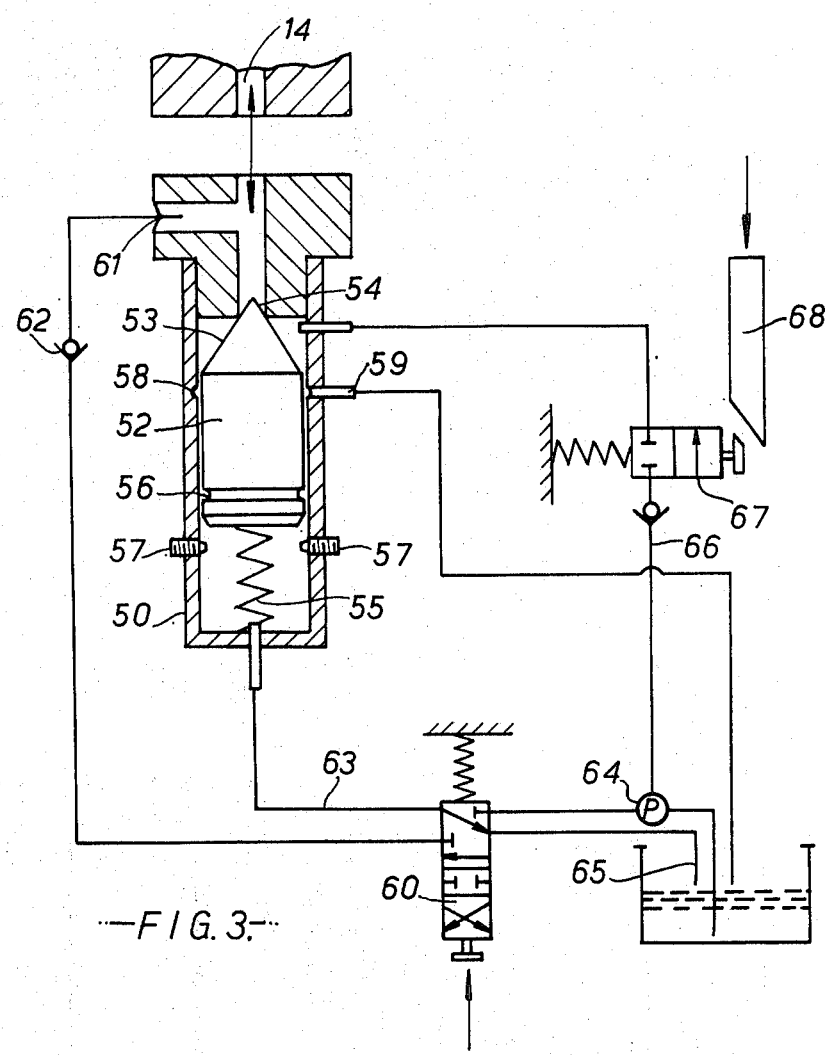

In FIG. 3 there is illustrated the hydraulic control device of the spindle press attached to the pressure-medium conduit 14. This control device is provided with a regulatable outflow valve, which is indicated generally by reference numeral 50. This outflow valve 50 has a cylindrically shaped valve casing 51, in which a piston shaped valve body 52 is displaceable. The piston-shaped valve body 52 is provided on one side with a conical control surface 53, which closes off an outflow nozzle 54. On the side lying opposite to the control surface 53 the piston-shaped valve body 52 is loaded by spring 55. The piston-shaped valve body 52 has on the end adjacent to the spring 55 a peripheral groove 56, in which ball catches 57 can engage, which catches are provided in the wall of the valve casing 51. In the wall of the valve casing 51 there is provided, further, an annular groove 58 connected with an outflow conduit 59. This annular groove 58 lies in the stroke path of the piston-shaped valve body 52 and is arranged in such a way that it is covered over by the piston-shaped valve body 52 when the valve 50 lies in its colosure position, whilst it is set free from the valve body 52 when the outflow valve is in its open position.

The pressure-medium inlet for the spindle press as well as the control of the outflow valve 50 takes place with the assistance of a control valve 60 which is schematically illustrated in FIG. 3. This control valve 60 lies above a pressure-medium conduit 61, in which a non-return valve 62 is arranged, the pressure-medium conduit 61 communicating with the pressure-medium conduit 14 of the spindle press. Furthermore the control valve 60 is connected by means of a pressure-medium conduit 63 to the pressure chamber of the outflow valve 50 containing the spring 55. On the other side the control valve 60 is connected to a pump 64 and a return pass 65. In addition the control illustrated in FIG. 4 also shows a stroke limiting device for the press piston. This consists of a pressure-medium conduit 66 arranged between the pump 64 and the pressure chamber above the control surface 53 of the control valve 50, in which conduit 66 is inserted a control valve 67. This control valve 67 is actuatable by a trip cam 68 connected with the press piston in a manner not illustrated.

The spindle press illustrated in the drawing and the associated control device function as follows:

By actuation of the control valve 60 first of all the pressure chamber of the outflow valve 50 containing the spring 55 is first pressure-loaded until the ball catches 57 set free the valve body 52 and this is pressed with its control surface 53 by the spring 55 against the outflow nozzle 54 and closes this.

In the next switch step of the control valve 60 the pressure-chamber of the outflow valve 50 containing the spring 55 is connected to the return pass, whilst the presure-medium conduit 14 is charged with pressure-medium through the pressure-medium conduit 61. Hereby, first of all, the pressure chamber 13 of the hydrostatic axial thrust bearing is charged with pressure, so that the axially movable bearing shoulder 11 is downwardly displaced. At the same time through the pressure-medium conduit 45, the pressure chamber 16 of the actuating device of the coupling 21, 22 is charged with pressure-medium. Thereby the actuating piston 17 is pressed upwardly so that the coupling 21, 22 closes. Through the spindle 6 thereby set in motion the pressure piston carrige 3 is pressed downwardly. The reaction forces arising are absorbed in the hydrostatic axial thrust bearing. Any pressure-medium loss from the pressure chamber 13 of this bearing or respectively from the pressure chamber 16 of the hydraulic actuating device for the coupling are compensated for by a slight displacement of the axially movable bearing shoulders 11, 11a and the therewith associated diminution of the pressure-chamber 13. In consequence of the pressure-medium conducting connection between the pressure chambers 13 and 16 and the surface ratios between the bearing surface of the hydrostatic axial thrust bearing and the surface of the actuating piston 17 it is ensured that the pressing force on the coupling always remains proportional to the pressure force arising.

On the attainment of a predetermined pressure force the conical control surface 53 closing off the outflow nozzle 54 is loaded with a force which is greater than the force of the spring 55. In consequence the control surface 53 is lifted somewhat from the outflow nozzle 54 so that now the total cross-sectional surface of the piston-shaped valve body 52 is subjected to pressure. In consequence of the much greater force now arising the piston-shaped valve body 52 is pushed back suddenly against the force of the spring 55 and engages with its groove 56 in the ball catches 57. At the same time the annular groove 58 and the outflow conduit 59 are set free.

Because of this sudden operation of the outflow valve 50 the pressure-medium pressure in the pressure-medium system formed by the pressure chambers 13 and 16 likewise collapses suddenly, so that in practice at the same time the axial thrust bearing is relieved and the coupling 21, 22 is opened.

If the pressure essential for operation of the outflow valve 50 is not obtained up to the end of the press stroke then the trip cam 68 engages the pilot valve 67 in such a way in order that a pressure-medium inflow into the space above the control surface 53 of the piston like valve body is set free. In this way the valve 50 operates at the end of the stroke path of the requisite pressure for opening of the outflow valve 50 is not obtained in the pressure-medium system.

Figure 4:
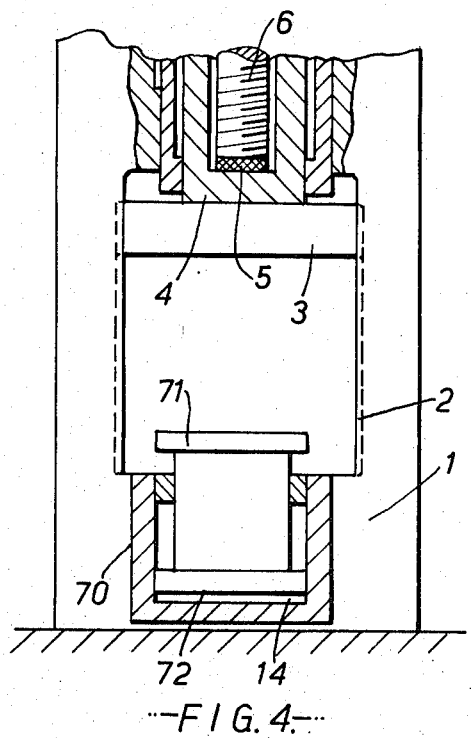

In FIG. 4 an alternative embodiment of the spindle press in accordance with the invention is illustrated. Herein in place of the hydrostatic thrust bearing serving as hydrostatic support device there is used a piston cylinder unit 70 arranged below a press table 71, the pressure-chamber 72 of which, (not illustrated in detail), communicates through pressure-medium conduit 14 with the pressure-chamber 16 of the actuating device of the coupling 21, 22 as well as with the outflow valve 50. The piston cylinder unit 70 absorbs the axial forces applied from the press piston and cooperates with the hydraulic operating device for the coupling device 21, 22 and the outflow valve 50 in the same way, as the hydrostatic axial thrust bearing in the previously described embodiment of the spindle press according to the invention. The hydrostatic support device formed as a piston cylinder unit for the axial forces of the press can, without departing from the basis concept of the invention, also be arranged elsewhere, in the press, for example in the upper part of the press above the axial thrust bearing of the spindle or in the press piston. In each case accordingly the pressure chamber of the hydrostatic support device and the pressure chamber of the hydraulic actuating device for the coupling are in communication by pressure-medium conduits and are also connected to a common outflow valve.

I claim:

1. A spindle press comprising a press-frame, a spindle, an axial thrust bearing mounting said spindle in said frame, a fly wheel, means for rotating said fly wheel continuously in one direction, a hydraulically actuated coupling arranged between and operative, during a work stroke of the press, to couple the fly wheel to the spindle, a hydrostatic support device in the press, for the absorption of the axial forces, said hydrostatic support device having a pressure chamber in pressure-medium communication with a pressure chamber of a hydraulic actuating device of the hydraulically actuated coupling, and a pressure-medium system, which includes said pressure chambers of the hydrostatic support device and hydraulic actuating device, connected to a common outflow valve which opens on the attainment of a predetermined pressure-medium pressure in said pressure-medium system.

2. A spindle press according to claim 1, wherein the hydrostatic support device is formed as a hydrostatic axial thrust bearing for the spindle.

3. A spindle press according to claim 1, wherein the hydrostatic support device is arranged in the upper part of the press above the axial thrust bearing of the spindle.

4. A spindle press according to claim 1, wherein the hydrostatic support device is arranged in a piston of the press.

5. A spindle press according to claim 1, wherein the hydrostatic support device is arranged on a press table of the press.

6. A spindle press according to claim 1, wherein the outflow valve is arranged in self-locking manner in the open position.

7. A spindle press according to claim 6, wherein the outflow valve has a spring-loaded piston-shaped valve body, which is displaceable in a cylindrical casing and has on the side remote from the spring a conical control surface, which serves for closure of an outflow nozzle, which has a smaller diameter than the piston-shaped valve body, the cylindrical shaped casing being provided with an outflow opening which lies in the stroke path of the piston-shaped valve body.

8. A spindle press according to claim 1, wherein the outflow valve is actuatable with the assistance of a stroke limiting switch actuated by the press piston.

9. A spindle press according to claim 8, wherein the stroke limiting switch is formed as a hydraulic pilot valve which on actuation sets free a pressure-medium inflow into a cylindrical space of the outflow valve above a piston-shaped valve body thereof.

10. A spindle press according to claim 1, wherein an axially movable part of the hydrostatic support device has a bearing surface, which is substantially larger than the surface of an actuating piston of the hydraulically actuated coupling.

11. A spindle press according to claim 1, wherein the hydraulic actuating device for the coupling has an actuating piston, the surface of which, impacted by pressure-fluid, is associated with a pressure chamber and which piston on the oppositely lying side is limited by an abutment, of the axially movable part, of the hydrostatic axial thrust bearing fixed to the spindle which acts as a piston.

12. A spindle press according to claim 11, wherein the actuating piston for the coupling and the axially movable part of the hydrostatic axial thrust bearing are formed annularly and are arranged coaxially to the spindle with the associated cylinders fixedly connected to the press frame.

* * * * *